(12) United States Patent
Garnreiter et al.

(10) Patent No.: US 7,025,096 B2
(45) Date of Patent: Apr. 11, 2006

(54) VALVE FOR CRYOGENIC MEDIA

(75) Inventors: Franz Garnreiter, Bruckmühl (DE); Rudolf Berghoff, Wedel (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/833,084

(22) Filed: Apr. 28, 2004

(65) Prior Publication Data

US 2004/0195535 A1    Oct. 7, 2004

Related U.S. Application Data

(63) Continuation of application No. PCT/EP02/11599, filed on Oct. 17, 2002.

(30) Foreign Application Priority Data

Oct. 29, 2001    (DE) ............................... 101 52 764

(51) Int. Cl.
    *B65B 1/04*    (2006.01)
(52) U.S. Cl. .............................. 141/3; 141/20; 141/301
(58) Field of Classification Search .................... 141/3, 141/20, 67, 82, 301, 302, 286; 222/146.6, 222/559, 402.16, 408.5
    See application file for complete search history.

(56) References Cited

U.S. PATENT DOCUMENTS

| 3,748,818 | A | * | 7/1973 | Rousseau ........................ 53/88 |
| 4,247,025 | A | * | 1/1981 | Gailitis .................. 222/402.18 |
| 4,522,222 | A | | 6/1985 | Carey, Jr. |
| 4,576,015 | A | | 3/1986 | Crawford |
| 4,648,431 | A | * | 3/1987 | Strongert et al. ............. 141/18 |
| 5,114,055 | A | * | 5/1992 | Worth ........................ 222/542 |
| 5,246,204 | A | | 9/1993 | Ottung |
| 5,452,746 | A | | 9/1995 | Hoobyar et al. |
| 5,586,745 | A | | 12/1996 | Knapp |
| 6,012,649 | A | * | 1/2000 | Riddell et al. .............. 239/307 |

FOREIGN PATENT DOCUMENTS

DE    40 33 491 A    4/1992
DE    41 14 122 A    11/1992

* cited by examiner

*Primary Examiner*—Steven O. Douglas
(74) *Attorney, Agent, or Firm*—Crowell & Moring LLP

(57) ABSTRACT

A valve comprising a valve needle, a valve housing, and a valve face for introducing a medium into a container. When the valve is closed, the front face of the valve needle and the valve housing are substantially flush with an inner surface of the container. Low tolerance range fits can be provided between the container and the valve housing and/or between the valve housing and the valve needle.

18 Claims, 3 Drawing Sheets

VALVE FOR CRYOGENIC MEDIA

CROSS-REFERENCE TO RELATED APPLICATIONS

This application is a continuation of International Application Patent Application No. PCT/EP02/11599, filed Oct. 17, 2002, designating the United States of America, and published in German as WO 03/038322, the entire disclosure of which is incorporated herein by reference. Priority is claimed based on German Patent Application No. 101 52 764.0, filed Oct. 29, 2001.

FIELD OF THE INVENTION

The invention relates to a valve having a valve needle, a valve housing and a valve face for introducing a medium into a container.

BACKGROUND AND SUMMARY OF THE INVENTION

Valves are known in diverse forms which are insufficiently suitable for introducing a medium into a container, particularly, if the container is filled with a material and is to meet superior hygienic requirements. The penetration of the container charge into indentations and gaps, which are characteristic of conventional valves, presents a special problem.

It is therefore an object of the invention to provide a valve which permits an efficient and economical introduction of the medium into a container, also with respect to the cleaning expenditures for the container if this container has to meet heightened hygienic demands.

This and other objects and advantages are achieved by a valve according to the invention, where the face of the valve needle, when the valve is closed, as well as the valve housing end essentially flush with an inner surface of the container.

In an embodiment, the valve face is mounted essentially in a plane with an outer surface of the container or at a small distance from this plane. This embodiment of the invention also has constructive advantages.

In another embodiment, when the valve is open, the valve needle is preferably overhung. Particularly preferably, a duct is provided for feeding the medium into the interior of the valve, whose longitudinal axis is arranged at an angle of between 30 and 90 degrees with respect to the longitudinal axis of the valve needle. The medium to be introduced therefore flows laterally onto the valve needle.

In still another embodiment, fits with low tolerance ranges are expediently provided between the container and the valve housing and/or between the valve housing and the valve needle.

In yet another embodiment, another object of the invention is the use of a valve constructed so that when the valve is closed, the face of the valve needle, as well as the valve housing, are essentially flush with an inner surface of the container. It is particularly advantageous to provide such a valve for introducing a cryogenic medium into a container, particularly a container containing food products.

When a valve according to an embodiment of the invention is installed, the surface of the interior wall of the container remains almost unchanged and smooth. This is particularly advantageous for containers which hold food products and which have to be cleaned on a regular basis. The risk of a bacteriological contamination by food residues, which are not picked up during the cleaning, can thereby be effectively lowered.

When closing a valve according to an embodiment of the invention, the valve is freed of any material which may have penetrated into the opened valve from the interior of the container. It is a special advantage that the valve is preferably inserted such that it closes in the direction of the material in the container. This is advantageous, for example, for highly viscous food products in a mixing, cooling or cooking container into which a medium is introduced, such as a liquid and/or inert gas.

BRIEF DESCRIPTION OF THE DRAWINGS

The invention as well as additional details of the invention will be discussed in detail in the following by means of various embodiments as illustrated in the figures.

DETAILED DESCRIPTION OF THE INVENTION

Figure 1:
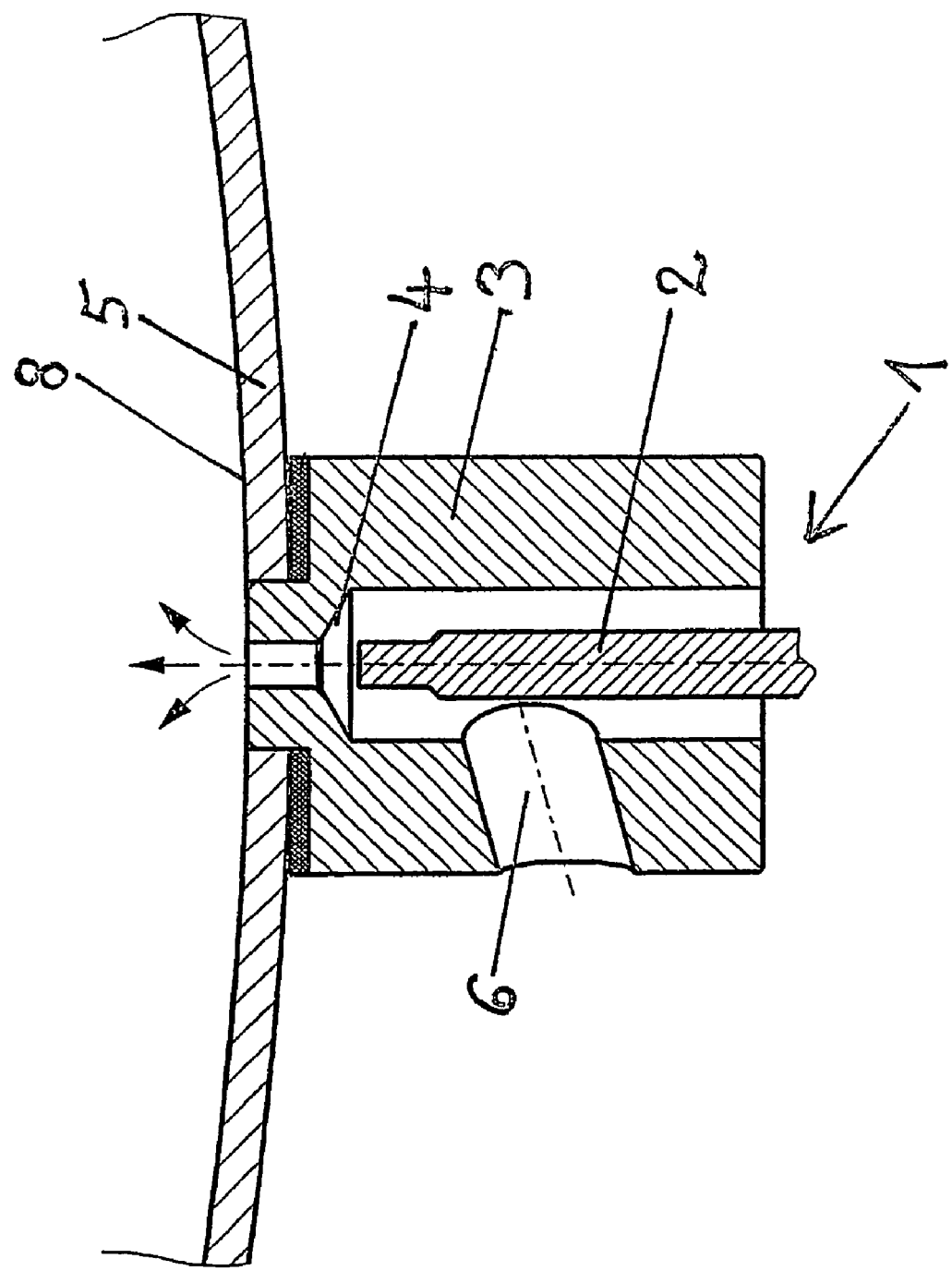
FIG. 1 is a schematic sectional view of a valve according to the invention on a container, the valve being shown in an opened position.

FIG. 1 illustrates a valve 1 according to an embodiment of the invention which has a valve needle 2, a valve housing 3 and a valve face 4. A medium, for example, a cryogenic coolant, such as liquid nitrogen or liquid carbon dioxide, which is to be introduced into a container 5 by means of the valve 1 according to the invention, first passes through the duct 6 which is connected (not shown) with a reservoir for the medium. The duct 6 leads into the interior of the valve 1, its longitudinal axis in this example being inclined by approximately 75 degrees with respect to the longitudinal axis of the valve needle.

This arrangement results in advantages particularly for an embodiment involving the introduction of a liquefied gas, such as liquid nitrogen. The liquid nitrogen flows out of its reservoir, in which it is present as a boiling liquid, into the duct 6 and flows laterally onto the valve needle 2. As a result, the valve needle 2, which is overhung when the valve 1 is opened, is caused to carry out vibrations. Since, when a boiling liquid is used, a gaseous fraction is necessarily present in the feed pipes, it is very advantageous that, as a result of the vibrations of the valve needle 2, the gaseous fraction evaporating from the liquid is mixed with the liquid, so that advantageously an approximately homogenous medium can be introduced into the container. This mixing also has a favorable effect on the introduction momentum of the mixture into the container and into a material present in the container. Thus, also in the case of a viscous material, such as a dough or a meat mass for the production of sausage, a coolant jet can be generated which penetrates deeply into the material and which ensures a very good mixing of the material and the coolant and thus a good heat exchange. These characteristics particularly improve the possibilities for introducing a coolant through the bottom of a container (see also FIG. 3), because the introduced coolant can also be reliably removed from the valve area.

Figure 2:
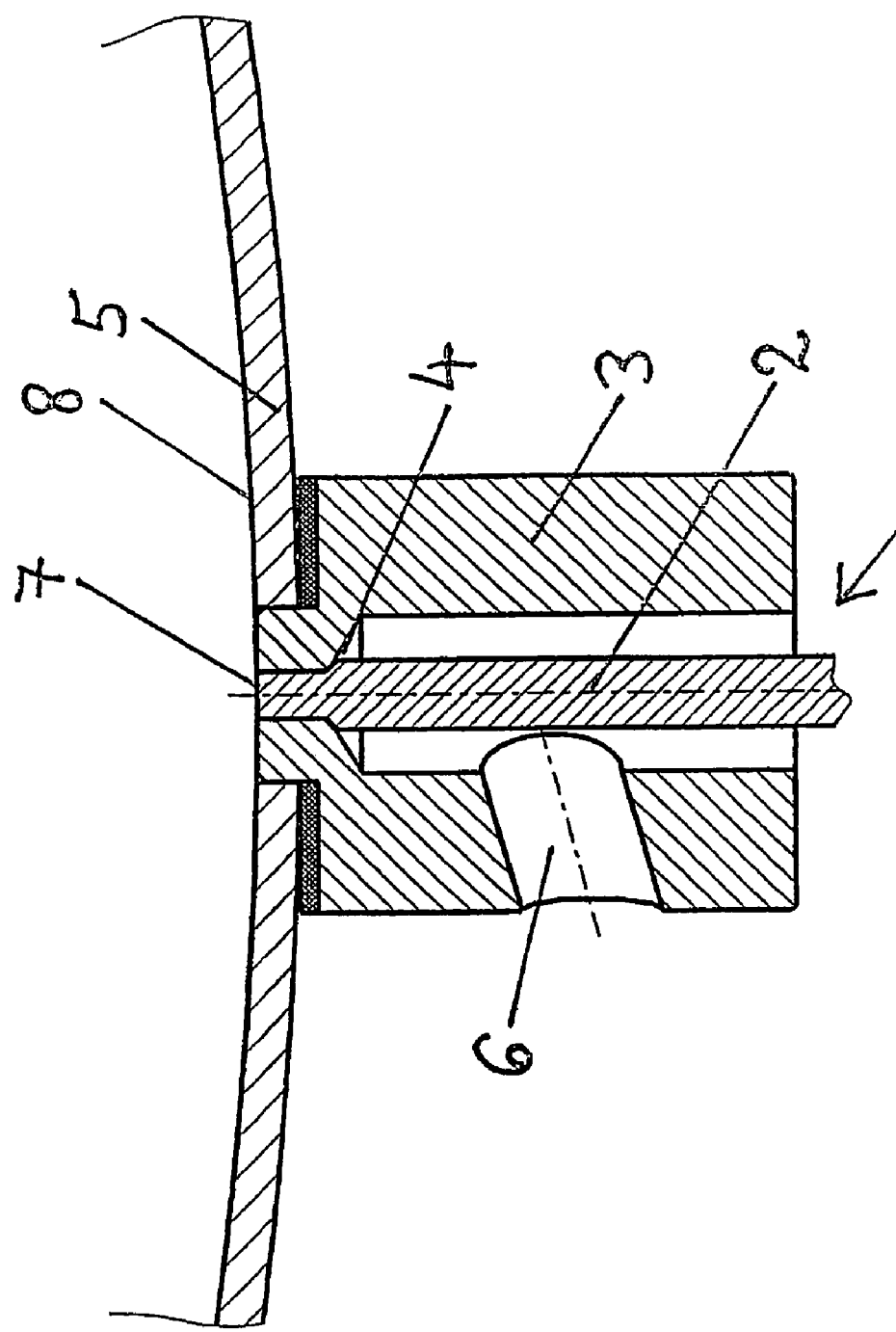
FIG. 2 is a schematic sectional view of a valve according to the invention on a container, the valve being shown in a closed position.

FIG. 2 illustrates a valve 1 according to an embodiment of the invention, which is closed. The introduction of the medium into the container 5 is interrupted. Advantageously, the face 7 of the valve needle 2 ends essentially flush with the inner surface 8 of the container 5.

Likewise, the essentially flush closing-off of the valve housing 3 with the inner surface 7 of the container 5 is illustrated. This embodiment prevents undesirable deposits of material, which is situated in the interior of the container, in the area of the valve 1 according to the invention. In another embodiment, low tolerance fits between container 5 and valve housing 3 and/or between valve housing 3 and valve needle 2 also contribute to this fact.

Figure 3:
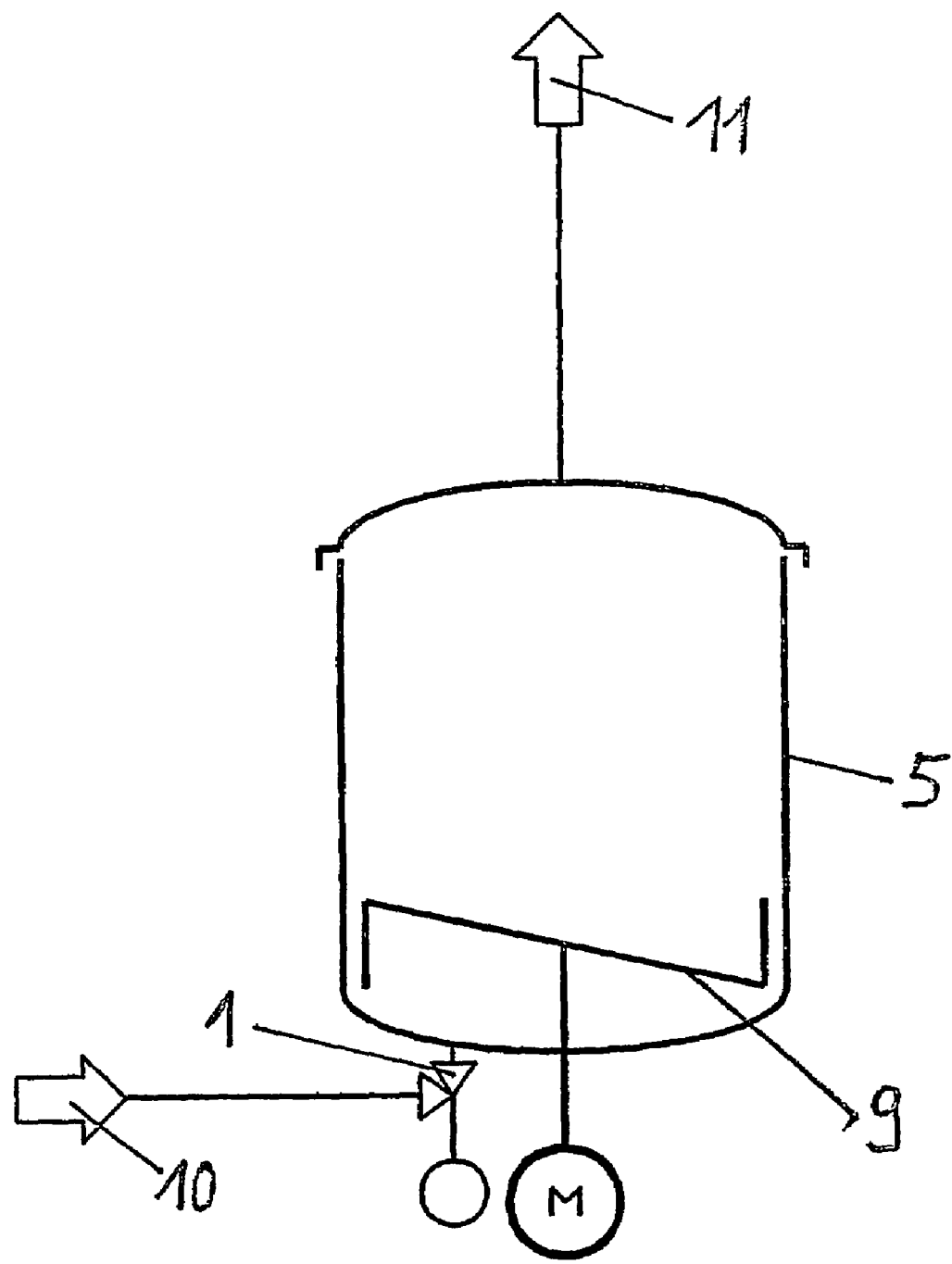
FIG. 3 is a schematic representation of a use of a valve according to the invention for introducing a medium into a mixing container, in the illustrated case, the valve being integrated in the bottom of the container.

In still another embodiment, FIG. 3 illustrates a use of a valve 1 for the introduction of a medium into a container 5 which is equipped with a mixing and cutting tool 9 and is filled with a material to be cooled and to be mixed as well as to be fragmented. In the illustrated case, the valve 1 is integrated in the bottom of the container 5. Furthermore, FIG. 3 shows a feed 10 for the liquid gas and an outlet 11 for a fraction of the coolant changed into the gaseous phase as a result of the heat transfer from the material to be cooled to the coolant.

The present invention is used particularly for the cooling and freezing of liquid, highly viscous and pellet-type products, particularly of food products or pharmaceutical products.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A valve for the introduction of a medium into a container, comprising:
    a valve needle;
    a valve housing; and
    a valve face,
    wherein when the valve is closed, a face of said valve needle and said valve housing are flush with an inner surface of the container and there is no annular gap between said face of said valve needle and said valve housing.

2. A valve according to claim 1, further comprising a valve seat mounted essentially in a plane with an outer surface of the container or at a narrow distance from said plane.

3. A valve according to claim 1, wherein said valve needle is disposed in an overhung manner when the valve is opened.

4. A valve according to claim 1, further comprising a duct for feeding a medium into the interior of the valve, said duct having a longitudinal axis arranged at an angle between 30 degrees and 90 degrees with respect to a longitudinal axis of said valve needle.

5. A valve according to claim 1, wherein a fit with a low tolerance range is provided between at least one of
    the container and said valve housing, and
    said valve housing and said valve needle.

6. A valve according to claim 1, wherein the valve introduces a medium into a container comprising a tool for mixing or cutting.

7. A method for introducing a cryogenic medium into a container, comprising:
    introducing a cryogenic medium into a container through a valve according to claim 1.

8. A method according to claim 7, wherein the container contains food.

9. A method according to claim 7, wherein the container comprises a tool for mixing or cutting.

10. A valve for the introduction of a medium into a container, comprising:
    a valve needle;
    a valve housing; and
    a valve face,
    wherein when the valve is closed, a face of said valve needle and said valve housing are essentially flush with an inner surface of the container and there is essentially no annular gap between said face of said valve needle and said valve housing, and
    wherein the valve is arranged such the valve needle face is withdrawn from the container when the valve is opened.

11. A valve according to claim 10, further comprising a valve seat mounted essentially in a plane with an outer surface of the container or at a narrow distance from said plane.

12. A valve according to claim 10, wherein said valve needle is disposed in an overhung manner when the valve is opened.

13. A valve according to claim 10, further comprising a duct for feeding a medium into the interior of the valve, said duct having a longitudinal axis arranged at an angle between 30 degrees and 90 degrees with respect to a longitudinal axis of said valve needle.

14. A valve according to claim 10, wherein a fit with a low tolerance range is provided between at least one of
    the container and said valve housing, and
    said valve housing and said valve needle.

15. A valve according to claim 10, wherein the valve introduces a medium into a container comprising a tool for mixing or cutting.

16. A method for introducing a cryogenic medium into a container, comprising:
    introducing a cryogenic medium into a container through a valve according to claim 1.

17. A method according to claim 16, wherein the container contains food.

18. A method according to claim 16, wherein the container comprises a tool for mixing or cutting.

* * * * *